May 12, 1964 N. ACKERMAN 3,132,376
FLUID ACTUATED LINEAR RECIPROCATING APPARATUS FOR
FORCING FLOWABLE MATERIAL THROUGH A PASSAGEWAY
Filed Aug. 8, 1960 5 Sheets-Sheet 4
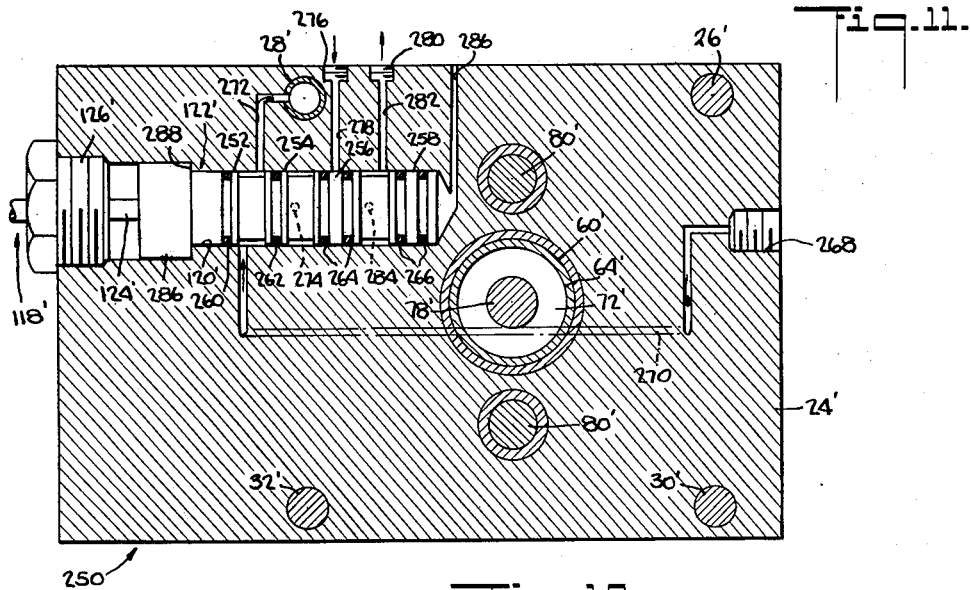
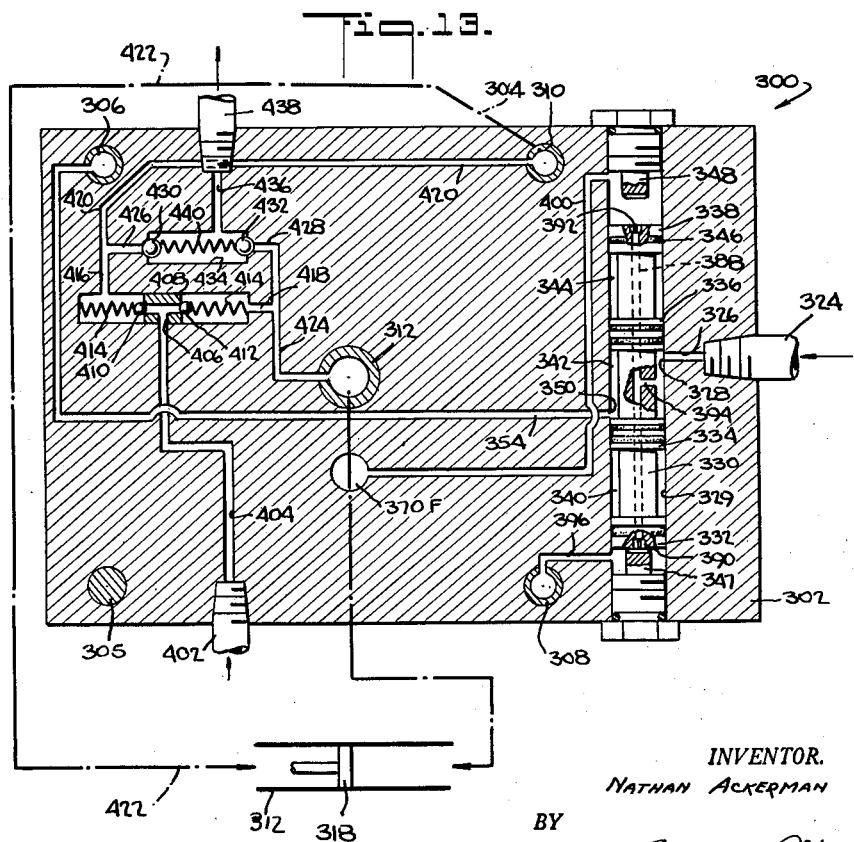
INVENTOR.
NATHAN ACKERMAN
BY
ATTORNEY

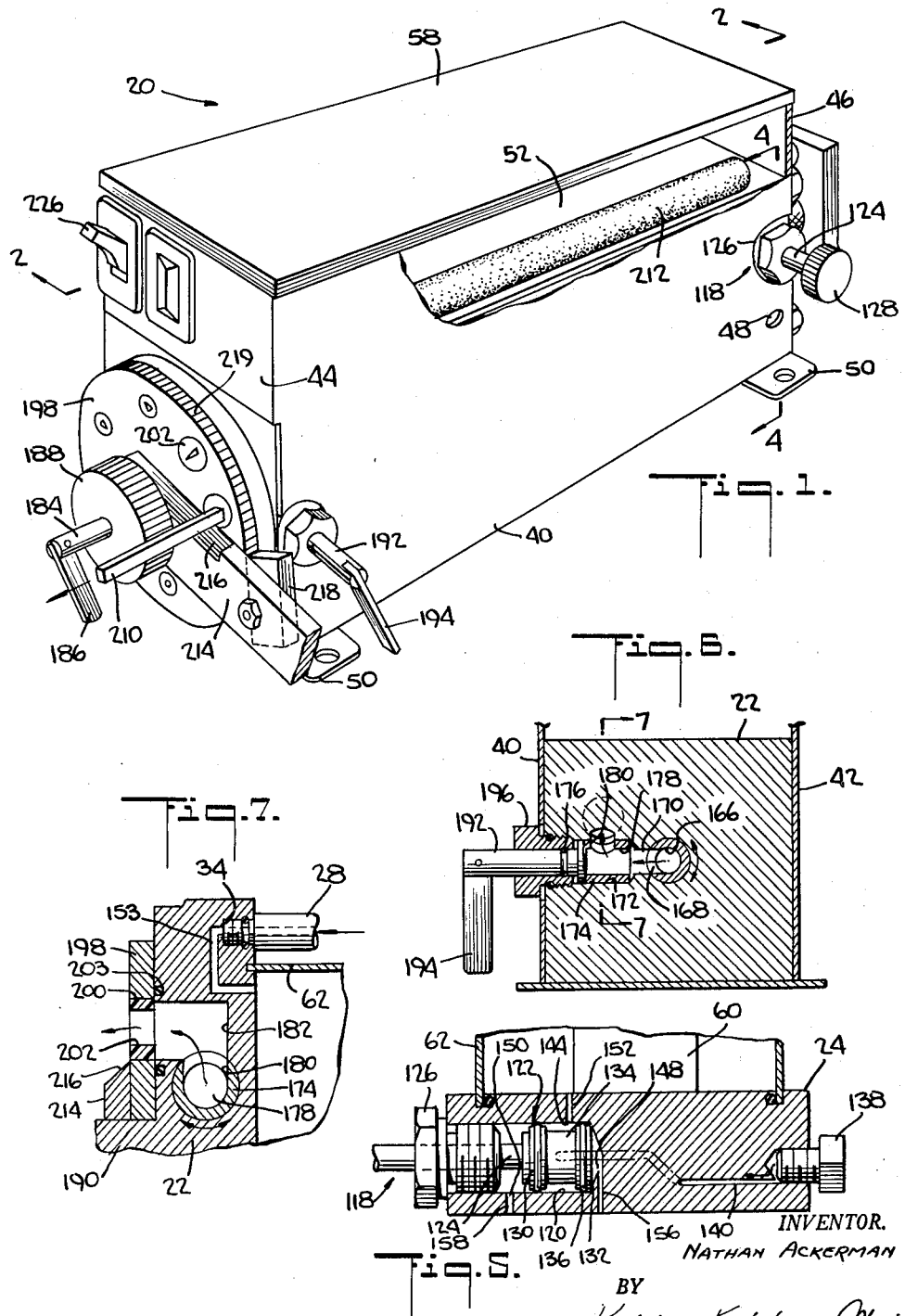

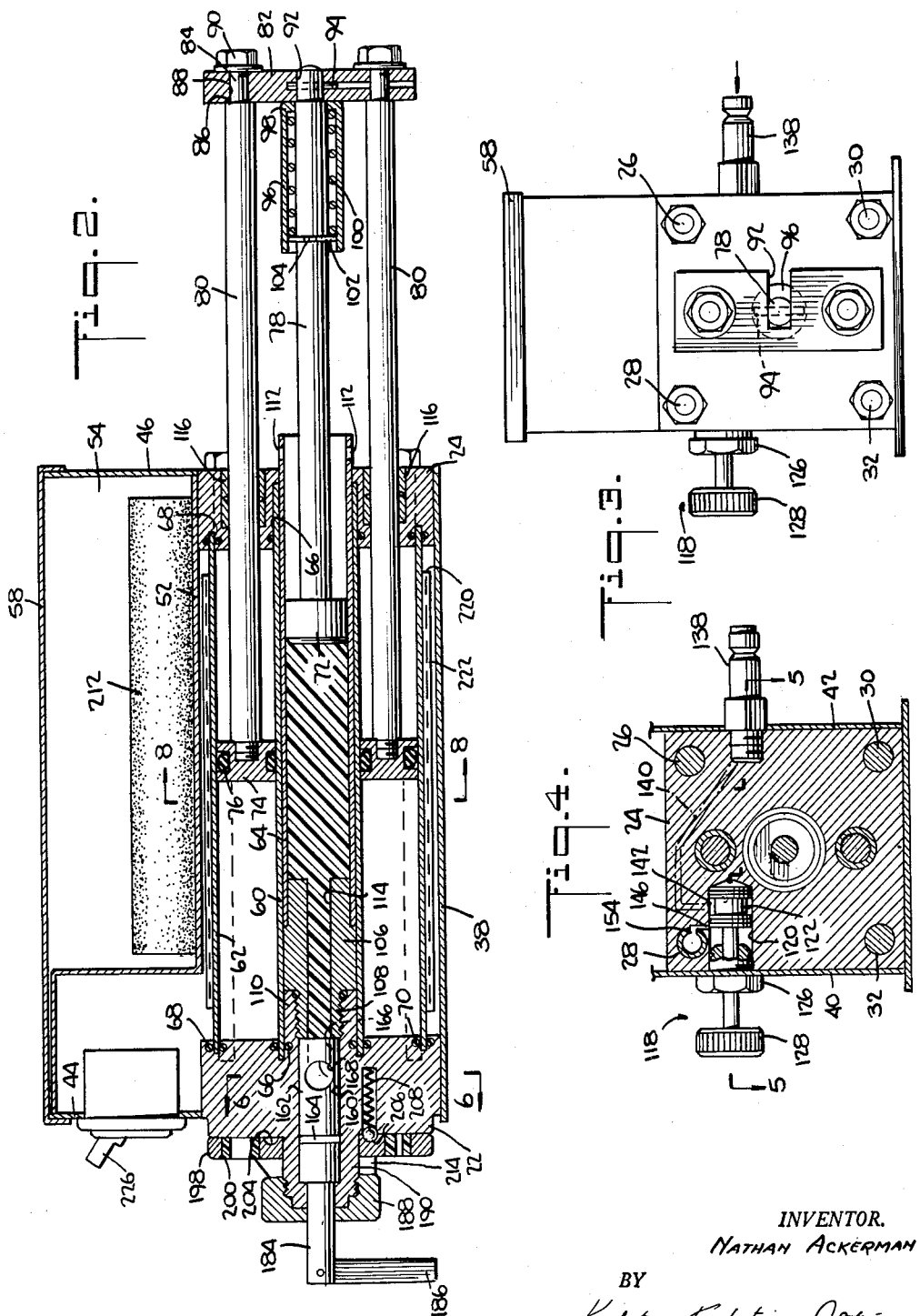

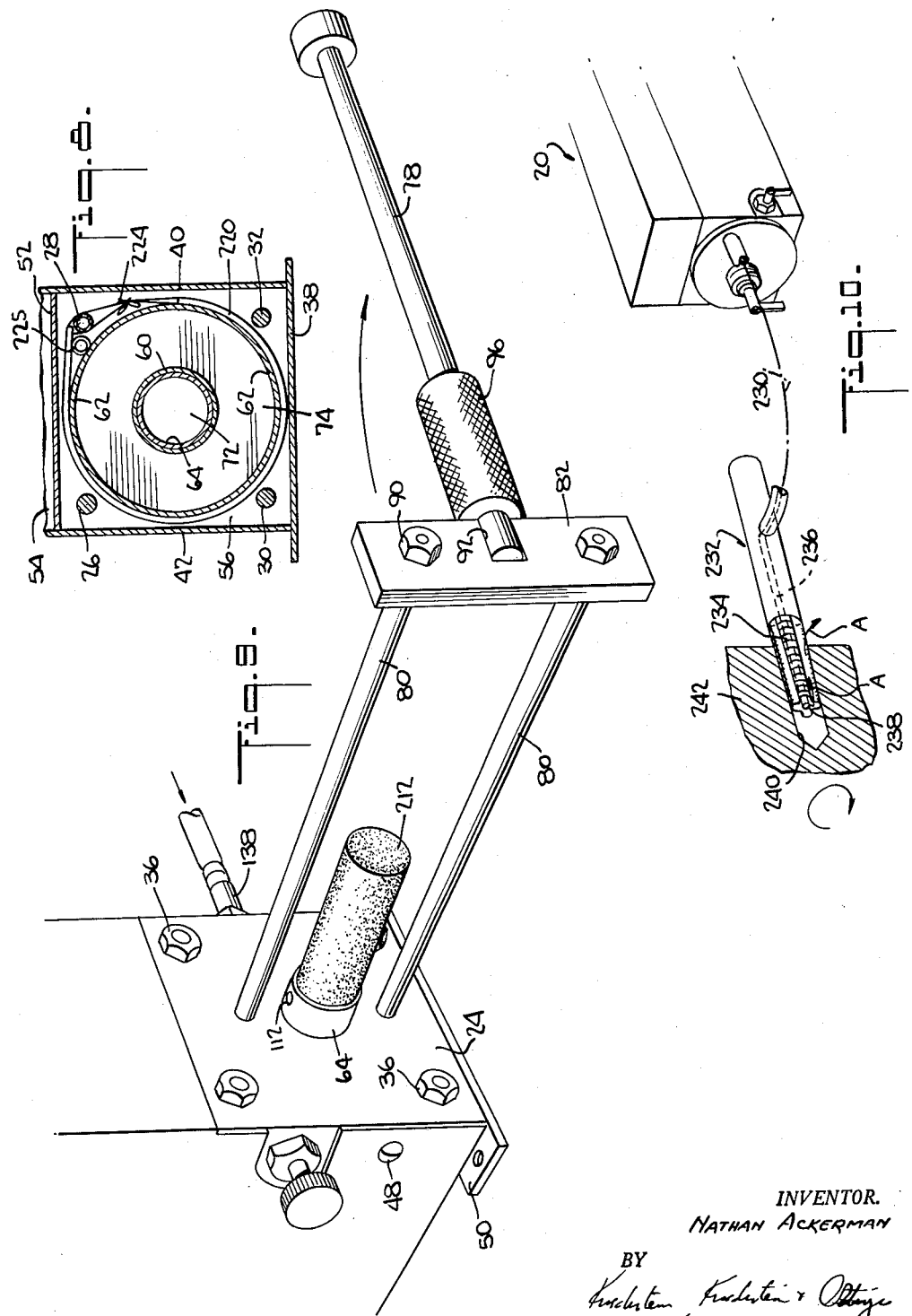

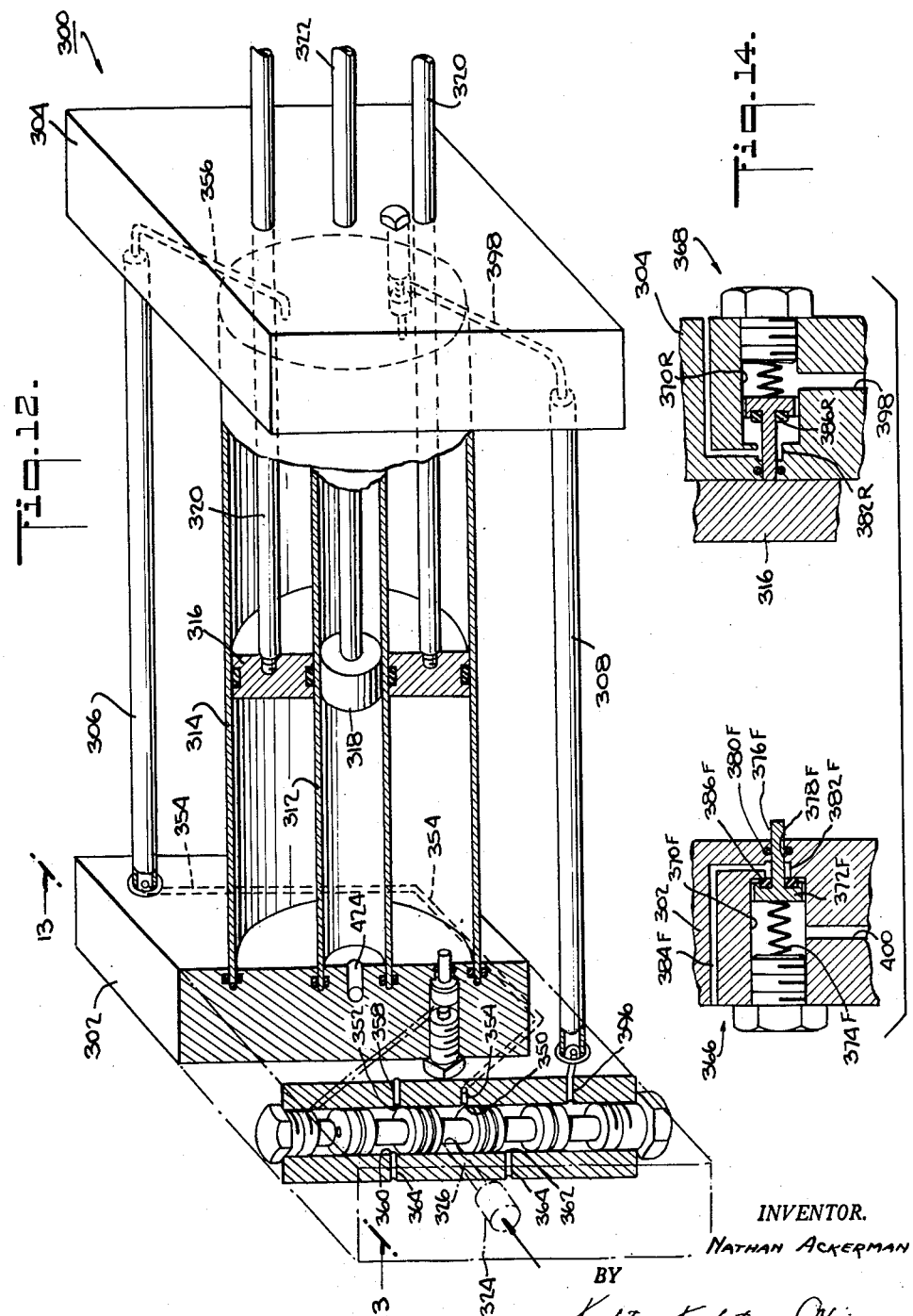

United States Patent Office 3,132,376
Patented May 12, 1964

3,132,376
FLUID ACTUATED LINEAR RECIPROCATING
APPARATUS FOR FORCING FLOWABLE
MATERIAL THROUGH A PASSAGEWAY
Nathan Ackerman, Lake Success, N.Y. (% Sandex Inc., 678 Berriman St., Brooklyn 8, N.Y.)
Filed Aug. 8, 1960, Ser. No. 48,055
5 Claims. (Cl. 18—12)

This invention relates to a fluid actuated linear reciprocating apparatus for forcing a flowable material through a passageway.

An apparatus of the character described essentially is a pressure converter or amplifier and, as such, has many applications of which a few will be described in detail hereinafter. For example, such an apparatus is useful as a batch or intermittently used wax extruder, or as a wax pump for flowing wax under pressure to a metal removing zone in order to carry away metal chips and metal scrap, or as an oil, grease, syrup, or fluid chemical pump.

Certain of said applications merit explanations. Thus, modeling and molding waxes are employed in various fields, e.g., for fabricating dentures, for forming dental impressions, in the lost wax process for molding jewelry and other articles, and for making casting molds in the optical trade. In all of these uses the amount of wax employed for a specific task is relatively small, for instance in the order of a few ounces, and it has become conventional, therefore, to furnish wax for such purposes in an elongated slender form such as a string, rod, or stick, wound on a reel or supplied in straight lengths. A user breaks off pieces as required for the job at hand. This is, of course, far more convenient than chipping, sawing, or otherwise obtaining chips or pieces from a large mass of bulk wax. However, string, rod and stick waxes are considerably more costly than bulk wax, often several times as expensive, and they necessitate a large inventory if more than one shape or area of cross-section is used in an industry. In addition the wax after being broken off from a length often must be plasticized by warming prior to pressing it to shape, e.g. for taking dental impressions.

It is an object of my invention to provide an apparatus which will furnish all the advantages of string, rod and stick waxes but which is attended by none of their disadvantages. That is to say it is an object of my invention to provide an apparatus that is small, compact, inexpensive, rugged, fool-proof and simple to use and which will extrude wax on demand, in large or small lengths, at the low cost of bulk wax, warm so that it is ready for use without further heating, and, optionally in any one of a plurality of sizes and shapes of cross-section so as to avoid the carrying or supplying of a large inventory.

It has been the practice heretofore when removing metal from small diameter openings in the interiors of bodies to allow a coolant fluid to carry away the metal chips, shavings and turnings. More recently it has been proposed to employ wax for the above purpose when the metal removing operation was threading a preformed bore, the wax being inserted as a preformed plug in the bore prior to the threading operation. This system was inapplicable to other similar metal removing operations particularly where metal had to be removed rapidly since the flow of the wax was exclusively a function of the rate of entry of the metal removing tool into the body.

It is another object of my invention to provide an apparatus, tool and process for securing an ample flow of wax under pressure to and away from an internal restricted metal removing zone whereby the rate at which the wax is supplied is independent of the rate of tool travel.

It is another object of this phase of my invention to provide an apparatus of the foregoing character which can form a light, compact and inexpensive adjunct to a metal removing tool that occupies a substantial portion of an opening in a body in which it is cutting.

It is a further object of my invention to provide a reciprocating pressure amplifier which is capable of use as a pump, extruder or the like and which is characterized by its relatively few and simple parts, ease of operation, unusual degree of longitudinal compactness, reliability, sturdiness, low cost and versatility.

It is an additional object of my invention to provide a reciprocating pressure amplifier which can be actuated by any source of fluid pressure or any combination of such sources.

It is yet another object of my invention to provide a reciprocating pressure amplifier the design of which lends itself to either a single or two stroke operation.

It is yet another object of my invention to provide a reciprocating pressure amplifier of the character described which can be used to furnish a continuous high pressure outflow and is, therefore, adapted to be used for pumping grease, oil, caulking compound, etc.

It is yet another object of my invention to provide a high pressure oil, grease or caulking gun which does not employ a motor driven pump as is conventional at the present time but which, is nevertheless, so light and small that it can be carried about manually by an operator for a greasing, oiling or caulking operation.

Other objects of my invention in part will be obvious and in part will be pointed out hereinafter.

My invention accordingly consists in the features of construction, combinations of elements, arrangements of parts and series of steps which will be exemplified in the extruders, pumps, tools and processes hereinafter described and of which the scope of application will be indicated in the appended claims.

In the accompanying drawings, in which are shown various possible embodiments of my invention, FIG. 1 is a front perspective view of a batch wax extruder embodying my invention;

FIG. 2 is a vertical central longitudinal section through said extruder, the same being taken substantially along the line 2—2 of FIG. 1;

FIG. 3 is a rear view of the extruder;

FIG. 4 is a vertical sectional view through the rear valve and cylinder supporting plate, the same being taken substantially along the line 4—4 of FIG. 1;

FIG. 5 is an enlarged horizontal sectional view taken substantially along the line 5—5 of FIG. 4;

FIG. 6 is a sectional view taken substantially along the line 6—6 of FIG. 2, the same showing one of the wax flow-control valves;

FIG. 7 is an enlarged fragmentary view taken substantially along the line 7—7 of FIG. 6;

FIG. 8 is a sectional view taken substantially along the line 8—8 of FIG. 2;

FIG. 9 is a fragmentary rear perspective view of the batch extruder during loading of a wax slug;

FIG. 10 is a perspective view of a system for supplying wax to remove chips, shavings and turnings during a metal removing operation in an opening in a body, the illustrated components of the system constituting a wax extruder, a material removing tool and a conduit for leading wax from the extruder to the tool.

FIG. 11 is a sectional view similar to FIG. 5 of an extruder embodying a modified form of my invention wherein one source of fluid under pressure is utilized to drive a thrusting member linearly in one direction and another source of fluid under pressure is utilized to drive the thrusting member in the opposite direction;

FIG. 12 is a broken away perspective view of a reciprocating pressure amplifier embodying another modified form of my invention in which the thrusting member supplies a continuous flow of extrudible material under pressure to an outlet passageway;

FIG. 13 is a sectional view taken substantially along the line 13—13 of FIG. 12 and illustrating the various valves, connections and conduits of the amplifier; and FIG. 14 is an enlarged fragmentary sectional view through the front and rear plates shown in FIG. 12, the same illustrating the bleed valves that are employed to reverse the automatic cycling valve mechanism for supplying fluid under pressure to the actuating cylinder.

In general I accomplish the several objects of my invention by providing a reciprocating pressure amplifier which constitutes an actuating member and a thrusting member which are respectively located in an actuating cylinder and a thrusting cylinder, wherein the cylinders are arranged in telescopic concentric relationship. Preferably the thrusting member and its associated cylinder are innermost and the actuating member and its cylinder are outermost. That is to say the actuating member and the actuating cylinder are annular while the thrusting member and the thrusting cylinder are solid. Moreover both members are provided with piston rods or the like which extend from said members in the same direction out of the cylinders and are linked together so that the solid inner member and the annular outer member linearly reciprocate in unison. Thereby the actuating member will drive the thrusting member.

The cross-sectional area of the actuating member is markedly larger than the cross-sectional area of the thrusting member so that a considerable pressure advantage is achieved. Yet this advantage is not accompanied by a large increase in weight, or by a large increase in size, by the presence of many parts, or by a considerable increase, e.g. doubling, of the length of the device, all of which are disadvantages that have attended previous reciprocating pressure amplifiers. Thus my novel pressure amplifier has achieved large multiplications of pressure applied to a thrusting member while maintaining the small size, lightness and reliability which are outstanding characteristics of my new device.

Referring now in detail to the drawings, and more particularly to FIGS. 1–10, the reference numeral 20 denotes a batch extruder, showing my invention as applied to a device for securing any desired length and any one of a large selection of shapes of a warm string, rod or stick of wax, e.g. dental wax or molding wax or casting wax.

Essentially the extruder 20 constitutes a thick front cylinder supporting plate 22, a thick rear valve and cylinder supporting plate 24 and a plurality, e.g. four, tie rods 26, 28, 30, 32 which hold said plates in rigid parallel spaced relationship. Certain of the tie rods are solid and one is hollow for a purpose which later will be pointed out. At this point it suffices to say that the tie rods perform the structural function of maintaining the front and back plates in their desired relationship. For this purpose each rod is formed at both ends thereof with shoulders (see FIG. 7) from which extend threaded portions of reduced diameter. The shoulders butt against the inner faces of the front and rear plates. The front plates are formed with tapped bottomed bores 34 into which the front ends of the tie rods are screwed home and the rear plate is formed with through openings (not shown) through which the reduced rear ends of the tie rods project to receive nuts 36. To present a finished appearance, for the purpose of protection and to provide storage space for pre-warming wax slugs, the extruder includes a casing which is made of sheet metal and comprises a bottom wall 38, side walls 40, 42, a fragmentary front wall 44 and a fragmentary rear wall 46. All of these are secured to one another and to the front and rear plates in any suitable manner, as for example by making all of these walls from a single piece of sheet metal and fastening some of the walls to the front and rear plates, as by screws 48. The bottom wall 38 may be provided with laterally protruding pierced mounting legs 50.

Furthermore I may provide within the casing thus formed a false bottom wall 52 that defines a storage compartment 54 above the same and a compartment 56 therebeneath in which the operating components of the extruder 20 are housed. The top of the casing and therefore the top of the storage compartment 54 is closed by a sheet metal cover 58 which is removed to insert wax slugs for prewarming or to extract a prewarmed plug when it is desired to insert the same in the breech opening of the thrusting cylinder.

In accordance with my invention I provide two cylinders, to wit; an outer thrusting cylinder 60 and an outer actuating cylinder 62. For various reasons I prefer not to have the thrusting piston directly engage the internal surface of the outer thrusting cylinder, although it is to be understood that this does not constitute a limitation upon my invention except to the extent set forth in the appended claims. Accordingly I provide a second, or inner, thrusting cylinder 64 which might be considered to be a sleeve or liner for the outer thrusting cylinder 60 and in general when I refer to a "thrusting cylinder" I will mean the inner thrusting cylinder 64 whenever cooperation with the thrusting piston is being described and I will mean the outer thrusting cylinder 60 whenever cooperation with the actuating piston is being described. These two thrusting cylinders may be considered as one from a functional point of view. However I have used one cylinder nested within the other in order to render the inner thrusting cylinder 64 replaceable and to reinforce the bi-element thrusting cylinder 60, 64 when high fluid pressures are developed. For example, if it is desired to change the type of wax ejected from the extruder I simply may withdraw the inner thrusting cylinder 64 with its still unused charge of wax and replace it with a fresh thrusting cylinder. In like manner if it is desired to provide extrusion of wax under higher pressures I will substitute for a thin walled inner thrusting cylinder 64 a different inner thrusting cylinder having a thicker wall and therefore having a smaller internal bore. The external diameter of the inner thrusting cylinder is such that the inner thrusting cylinder is a slidable snug fit within the outer thrusting cylinder.

The opposite ends of the outer thrusting cylinder 60 and the actuating cylinder 62 are open and are snugly received in annular grooves 66, 68 in both the front and back plates 22, 24. To prevent leakage, the grooves 66, 68 are themselves provided with internal channels in which O-rings 70 are disposed for engaging the inner and outer surfaces of the ends of the cylinders 60, 62 whereby the internal spaces in said cylinders are tightly sealed. Although it has not yet been specifically mentioned, it is obvious that the cylinders 60, 62, 64 are tubular. The grooves 66, 68 are concentrically arranged so that the outer thrusting cylinder 60 is supported telescopically and coextensively within and concentrically of the actuating cylinder 62. It will be apparent that the inner thrusting cylinder 64 bears the same general relationship as the outer thrusting cylinder 60 with respect to the actuating cylinder 62.

By means of the foregoing arrangement I have provided an annular actuating space between the thrusting cylinder 60, 64 and actuating cylinder 62, and what might be referred to as a "solid" thrusting space inside the thrusting cylinder 64.

In the aforesaid spaces I provide respectively a thrusting member 72, i.e. a thrusting piston, and an actuating member 74, i.e. an actuating piston. The thrusting piston 72 is solid and is a tight sliding fit in the thrusting cylinder 64. The actuating piston 74 is hollow, i.e. annular, and is a tight sliding fit on the inner surface of the actuating cylinder 62 and on the outer surface of the thrusting cylinder 60. The actuating piston 74 is provided with inner and outer sealing O-rings 76. Optionally the thrusting piston 72 may be provided with a like O-ring; however I have found that this is not necessary since wax, even under high pressures, does not tend to escape through the sliding clearance between the thrusting piston and the thrusting cylinder.

Extending rearwardly from the thrusting piston 72 is a thrusting piston rod 78 and extending rearwardly from diametrically opposed portions of the actuating piston 74 are a pair of actuating piston rods 80. All of the piston rods are parallel during operation and the rear ends of all said rods are tied together for common movement by a cross bar 82.

The rear ends of the piston rods 80 have reduced tips 84 forming shoulders 86. Said shoulders abut against the front face of the cross bar 82, and the tips 84 extend through openings 88 in the cross bar. The protruding ends of the tips are threaded to receive nuts 90 upon the tightening of which the actuating piston rods are held fast and firm to the cross bar.

The rear end of the thrusting piston rod 78 is not reduced. Said end is located in a slot 92 (FIGS. 2, 3 and 9) opening at a side edge and extending laterally into the cross bar. The width of the slot is such as to snugly admit the rear end of the piston rod 78; however the length of the slot is sufficiently great to permit the piston rod 78 to swing with respect to the cross bar. Said piston rod 78 is pivotally anchored to the cross bar by a pin 94 which pierces the rear end of the piston rod 78 and is secured in the cross bar in a position bridging the slot 92. The piston rod 78 is shorter than the piston rods 80 (see FIG. 2) by an amount which will enable the thrusting piston 72 to be drawn fully out of the thrusting cylinder 64 when the actuating piston 74 is at the rearward extreme of its travel in contact with the rear plate 24. When in such extreme position the thrusting piston 72 and its associated piston rod 78 can be swung out of their operative position in alignment with the longitudinal axis of the thrusting cylinder into an idle or charging position as shown in FIG. 9, in which a clear space is provided between the rear plate 24 and cross bar 82 that is big enough to accommodate the length of the inner thrusting cylinder 64 and a coupling plug for the same soon to be described.

Means is included to detain the piston rod 78 in its operative or idle positions. Said means constitutes a tube 96 having an inturned flange 98 at its rear end. A helical spring 100 encircling the rear end of the piston rod 78 is held under compression between the flange 98 and a C-ring 102 caught in a groove 104 in the said rod within the tube 96. In operative position of the piston rod 78 the flange 98 is biassed into flat engagement with the flat front face of the cross bar, and in the 90° swing-out idle position of the piston rod 78 the flange 98 is biassed into flat engagement with the flat side face of the cross bar. The spring 100 resiliently urges the piston rod 78 into either of said positions which the rod approximately occupies.

To enable the inner thrusting cylinder 64 to be removed or replaced, said cylinder is tightly secured at its forward end to a coupling plug 106 the forward end 108 whereof is male threaded for engagement with a tapped socket 110 extending rearwardly from the front plate 22. The outer thrusting cylinder 60 is a tight telescopic fit on the exterior of the socket. Pairs of registered castle openings 112 are formed in the rear end of the inner thrusting cylinder which protrudes from the outer thrusting cylinder at the rear of the extruder. The inner thrusting cylinder can be coupled or uncoupled from the socket 110 by inserting a rod-like tool through a registered pair of openings 112 and turning said cylinder. The plug 106 has a through passageway 114 leading from the front of the inner thrusting cylinder to the front of the plug.

Suitable glands 116 mounted in the rear plate 24 prevent leakage of fluid where the actuating piston rods 80 pass through said plate.

A manually operable control valve 118 is provided to cycle, i.e. reverse, the actuating piston 74. Said valve includes a valve cylinder in the form of a bore 120 (FIGS. 4 and 5) extending into the rear plate 24 from a side wall thereof and a valve piston 122 slidable in the bore.

The valve piston 122 comprises a spindle 124 slidable in a pressure gland unit 126 screwed into the tapped mouth of the bore 120, the protruding end of the spindle carrying a manipulating knob 128. The inner end of the spindle is fixed to a valve body comprising a pair of spaced flanges 130, 132 separated by an annular space 134. Each flange is provided with a groove in which a sealing O-ring 136 is located. The piston 122 is slidable between an innermost position as shown in FIG. 5 in which the flange 132 abuts the conical blind end of the bore 120 and an outermost position in which the flange 130 abuts the inner end of the gland nut 126.

Fluid under pressure, e.g. compressed air, is supplied from a suitable source (not shown) to a coupling 138 screwed into the rear plate 24 and connected by a passageway 140 to a feed port 142 in the bore 120 at a point which always communicates with the annular space 134 regardless of the position of the piston 122. Also opening into the bore 120 are two spaced outlet ports 144, 146 and two spaced exhaust ports 148, 150. All the aforesaid ports are spaced apart longitudinally of the bore 120. The outlet port 144 is connected by a passageway 152 to the rear end of the annular actuating space. The outlet port 146 is connected by a passageway 154 (see FIG. 4) to the hollow interior of the hollow tie rod 28. The exhaust ports 148, 150 are connected by passageways 156, 158 to the atmosphere.

In the innermost position of the valve piston 122 (see FIGS. 4 and 5) the O-ring 136 on the flange 132 separates the exhaust port 148 from the outlet port 144 with which it is associated; the annular space 134 connects the feed port 142 with the outlet port 144 so that air under pressure is supplied to the rear surface of the actuating piston 74; the O-ring 136 on the flange 130 separates the feed port 142 from the outlet port 146; and the space around the spindle 124 connects the outlet port 146 with the exhaust port 150. The front end of the hollow tie rod 28 is connected by a passageway 153 (see FIG. 7) with the front end of the annular actuating space so that with the control valve 118 in its aforesaid innermost position the front surface of the actuating piston 74 is exposed to atmospheric pressure. Accordingly the actuating piston will be urged forwardly and the total forward actuating force will be transmitted through the piston rods and cross bar to the thrusting piston 72 to drive it forwardly.

In the outermost position of the valve piston 122 the O-ring on the flange 132 separates the feed port 142 from the outlet port 144; the inner space at the blind end of the bore 120 connects the exhaust port 148 with the outlet port 144; the annular space 134 connects the feed port 142 with the outlet port 146; and the exhaust port 158 is isolated from the outlet port 146 by the O-ring on the flange 130. Thereby high pressure is applied to front face of the annular actuating piston and low pressure to its rear face with consequent reversal of force on the thrusting piston.

Since the area of the actuating piston is considerably larger than the area of the thrusting piston a considerable amplification of pressure is obtained, a typical increase in pressure being tenfold.

The front plate 22 is shaped to include a rearwardly extending bore 160 (see FIG. 2) in which a first cylindrical wax valve body 162 is rotatable. Said bore 160 is sealed by an O-ring 164 on the valve body. The rear end of the valve body 162 is axially hollowed to provide a rearwardly opening passageway 166 and is laterally perforated by a port 168. When wax is present in the thrusting cylinder in front of the thrusting piston it will be forced through the bore 114 into the axial passageway 166 which is in alignment and communication therewith. From there wax will flow into the lateral port 168. By rotating the first wax valve 162 flow of wax from the thrusting cylinder can be cut off or variably regulated at will.

The plate 22 has a passageway 170 (see FIG. 6) which is adapted to be registered with the port 168 upon manipulation of the first wax valve 162. This passageway runs into a bore 172 in which a second cylindrical wax valve body 174 is rotatable. Said bore is sealed by an O-ring 176 on the valve body 174. The inner end of the valve body 174 is axially hollowed to provide a laterally extending passageway 178 in permanent communication with the passageway 170. The axial passageway 178 has a lateral branch 180 which is adapted to be rotated into alignment with a stationary delivery passageway 182 (see FIG. 7) that opens onto the front face of the front plate 22.

It will be apparent that the wax exiting from the first wax valve 162 flows to the second wax valve 174 which thereby is connected in series with the first wax valve and that rotation of the second wax valve likewise is capable of either cutting off or variably regulating the flow of wax at will.

I have provided two wax valves in series so that one of them may be employed as an off-and-on valve and the other as a flow regulator. That is to say, one of the valves is left in a partially opened position depending upon the rate at which it is desired to extrude wax and the other valve is moved either to off or on position depending upon whether wax is to be extruded or not. Obviously at the option of the user either valve can be used for cut-off or controlling rate of flow.

In order to expedite manual manipulation of the first wax valve 162, the body of said valve is provided with a forwardly extending stem 184 (see FIGS. 1 and 2) at the tip of which a handle 186 is mounted. The stem extends through a continuation of the bore 160 and also through a central opening in a cap 188 that is screwed on a cylinder boss 190 extending forwardly from and integral with the plate 22. In like manner, for expediting manual manipulation of the second wax valve 174, the body thereof is provided with a laterally extending stem 192 having a handle 194 (see FIGS. 1 and 6). Said stem is rotatable in a pressure bushing 196 screwed into a tapped opening at the mouth of the bore 172.

It now will be apparent that when the cycling valve knob 128 is pushed in as far as it will go, wax will be extruded from the front of the thrusting cylinder, through the two wax valves in series to emerge from the delivery passageway 182 at the front face of the front plate 22 providing, of course, that said wax valves are open.

If but a single shape and cross-section of extruded wax is required, the same can be taken at the exit opening of the delivery passageway and it merely is necessary to turn one of the wax valves off or on to obtain the desired length of extrusion. However, in the preferred form of the invention means is included to provide various shapes and cross-sectional areas of wax extrusion. Said means constitutes a centrally apertured disc 198 rotatably journalled on the cylindrical boss 190. The disc is captively secured by the cap 188 which presses said disc against the front face of the front wall 22. Said disc 198 is formed with an annular series of openings 200 which are adapted to be brought successively into registration with the exit opening of the delivery passageway 182. Each opening 200 has secured therein a plug 202 and the different plugs are formed with extrusion perforations of different sizes and shapes as shown for example in FIG. 1. Thus, some of the perforations may be round, others square, others triangular, others hexagonal and others may be differently dimensioned depending upon the use at which the extruded wax is to be put. An O-ring 203 sunk in the front face of the front plate around the exit opening of the delivery passageway and in sealing engagement with the back of the disc 198 prevents escape of wax at this point.

In order to facilitate registry of the openings 200 with the exit opening of the delivery passageway 182, I provide a series of indentations 204 (see FIG. 2) in the rear face of the disc 198 and I further provide a ball 206 urged forwardly by a spring 208 in a position in which it is to be adapted to be seated in any one of the indentations 204. Said indentations are annularly arranged on the disc in such locations that when the ball 206 is received in any one of them a corresponding opening 200 will be in registry with the exit opening of the passageway 182. Thereby a rod 210 of wax of the desired cross-sectional shape and dimensions will be extruded as shown in FIG. 1.

When the wax in the inner thrusting cylinder 64 has been exhausted or when it is desired to change the type of wax being extruded, the cycling control knob 128 is pulled to its outermost position thereby driving all the pistons rearwardly and clearing the thrusting piston from the inner thrusting cylinder. Then the thrusting piston rod 78 is swung out of the way. If another inner thrusting cylinder 64 is to be used, the old one is uncoupled from the extruder and a new one coupled in its place. If fresh wax is to be inserted, a wax slug 212 (see FIG. 9) is thrust into the breach (open rear end) of the inner thrusting tube. The wax slug is short enough to be fully received therein. Thereafter the piston rod 78 is swung back into alignment and the cycling knob 128 pushed back to its innermost position whereupon the extruder is ready for operation.

It will be appreciated that the extruded length of wax 210 can be broken off substantially flush with the front face of the disc 198; however means may be included to simplify the separation of the extruded length of wax. Such means comprises an arm 214 having a central opening rotatably journalled on the boss 190. An edge 216 of the arm is sharpened to provide a knife so that when the arm is swung into an extruded length 210 of wax it will cut the same off flush with the disc 198.

For convenience, the arm 214 also may be utilized to aid in turning the disc 198 from one to another selected position. To this end the arm includes a pawl 218 pivoted on the same end having toothed corners adapted to engage the knurled edge 219 of the disc 198. The pawl is swung to inoperative position when the knife merely is being used to cut lengths of extruded wax.

To expedite the handling of harder varieties of waxes, and in general to ease operation of the extruder 20, means is included to heat the cylinders. Such means is in the form of a flexible resistance element 220 comprising, for instance, fine resistance wires 222 laid out in a suitable array between a pair of flexible electrically non-conductive plies. The flexible resistance element is wrapped about the outer surface of the actuating cylinder 62 (see FIGS. 2 and 8) and is held in position with a lacing cord 224. The heat thus generated will penetrate to the wax in the inner thrusting cylinder by means of conduction through the metal parts and convection through the annular actuating space.

It has been found that the heat thus provided suffices, if properly controlled, to keep the wax in easily extrudible condition. The current flowing through the resistance wires 222 is regulated by a thermostatic sensing element 225 interposed between the flexible resistance element and the actuating cylinder (see FIG. 8). An electric switch 226 controllably supplies current to the thermostat and resistance wires.

The heat supplied by the flexible resistance element also penetrates the false bottom 52 to bring the compartment 54 to a suitable temperature for prewarming wax slugs 212 contained therein (see FIG. 1). Preferably the wax slugs fed into the breech of the thrusting tube are prewarmed in such a manner.

The extruder 20 can be employed for purposes other than the formation of sticks, rods and strings of wax.

One alternate use thereof is illustrated in FIG. 10. For this use the shape of the extruded wax is of no importance and lengths of extruded wax are not desired; hence the shaping disc 198 and the cutting arm 214 are not needed and are omitted. For the same reason the cap 188 is omitted. Instead the exit end of the delivery passageway 182 is threaded for attachment thereto of a metal conduit 230. Thus as the thrusting cylinder 72 is moved forward, wax will be forced to flow under a substantial pressure through the conduit 230.

The conduit leads to a lateral passageway in a rotary type metal removing tool 232. By "rotary type" there is denoted a tool which experiences rotation relative to a body from which metal is to be removed. Either the tool rotates with respect to the body or the body rotates with respect to the tool. Moreover the tool is of a type which, for at least a material portion of its operation, is located within an internal restricted zone, e.g. a bore, and substantially fills the zone. Typical tools of the aforesaid type are drills, broaches, reamers and taps. As shown in FIG. 10 the tool 232 is a tap. Moreover the aforesaid tools further are characterized by the presence of grooves, flutes or reliefs which extend in a direction having a substantial component running axially of the length of the tool. Such grooves etc. ordinarily are provided for the escape of metal removed by the tool. The tool 232 employed according to a feature of the present invention, includes such grooves 234.

However, in addition, the tool includes a completely confined passageway 236 running axially of the tool and being located, for example, along the center line of the tool. The passageway 236 connects with the lateral passageway which is connected to the conduit 230. Accordingly wax under pressure is supplied to the axial passageway 236 and will emerge under pressure through the opening 238 adjacent the tip of the tool.

The tap 232 operates for the purpose of cutting a female thread in a bore 240 previously formed in a work body 242 which is arranged to be turned bodily, as for example in the chuck of the lathe, about an axis coincident with the central longitudinal axis of the bore 240.

It will be appreciated that during the tapping operation the tap substantially blocks the bore 240 except for the outer, i.e. surface grooves 234. Wax flowing out of the extruder and through the conduit 230 into the passageway 236 will emerge from the forward end of the tap, quickly fill the bore and then will be forced out of the bore through the external grooves 234 as indicated by the arrows A. As the wax flows out of the bore through these grooves it will be carrying with it the shavings, chips and turnings removed from the walls of the bore by the tap. The wax also will function as a coolant both by virtue of its specific heat and its heat of fusion.

Another alternate use of the extruder 20 is as a grease gun, caulking gun, etc. The extruder is made small enough to be hand-held and a grease fitting is attached to the end of the conduit 230.

It is understood by those skilled in the extrusion art that some materials are more easily extrudible than others and that as less easily flowable materials are employed, higher pressures per square inch will have to be utilized at the thrusting cylinder. Increase in pressure may be obtained in several ways. For example by using a higher unit pressure in the actuating cylinder or by using a higher amplification ratio, e.g. by substituting an inner thrusting cylinder 64 of thicker wall section. This latter method is self-defeating when substantial increases in pressure are desired because it reduces the capacity of the thrusting cylinder; hence ordinarily it is preferred to increase the pressure in the actuating cylinder.

When air is used to drive the actuating cylinder there is a practicable limit to the pressure employed. Although from theoretical considerations air could be used under any pressure, it is not desirable to use air at pressures upwards of 250 lbs. p.s.i. It is generally considered that the use of air at higher pressures is too dangerous since, if there is a break in the line, the outwardly expanding action of the air simulates an explosion. Therefore, for higher pressures it is better for the extruder to be driven in an extruding direction by liquid under pressure rather than air under pressure and for economy to move the extruding piston in a retrograde direction by air under pressure.

An extruder 250 embodying a modified form of the present invention with an oil extruding drive and an air return is illustrated in FIG. 11. The extruder 250 is identical with the extruder 20 except for the supply of fluids under pressure to opposite ends of the actuating cylinder 62, fluid to the forward end of the actuating cylinder being conducted through the hollow tie rod 28. Accordingly the various parts of the extruder 250 which are the same as corresponding parts of the extruder 20 will be denoted by the same reference numerals which, however, are primed for the purpose of maintaining a line of differentiation.

The extruder 250 has a rear plate 24′ through which the tie rods 26′, 28′, 30′ and 32′ pass. The tie rod 28′ is hollow and is connected by a suitable passageway (not shown but similar to the corresponding passageway 153 in the extruder 20) to the front end of the annular actuating cylinder of the extruder 250. Operable in said annular actuating cylinder is an annular actuating piston carrying a pair of parallel actuating piston rods 80′. The extruder 250 also has outer and inner thrusting cylinders 60′, 64′ in which there operates a thrusting piston 72′ having a thrusting piston rod 78′. All the pistons are tied together by a cross-bar (not shown).

A manually operable control valve 118′ is provided to cycle, i.e. reverse the actuating piston. Said valve includes a valve cylinder in the form of a bore 120′ extending into the rear plate 24′ from a side wall thereof and a valve piston 122′ slidable in the bore. The valve piston 122′ comprises a spindle 124′ slidable in a pressure gland unit 126′ screwed into the tapped mouth of the bore 120′. The inner end of the spindle is fixed to a valve body of more complex shape than the body of the valve 118.

The valve body 122′ includes four annular flanges 252, 254, 256 and 258 spaced longitudinally of the valve body. The flange 252 is grooved to receive a single O-ring 260. The flange 254 is grooved to receive a single O-ring 262, the flange 256 is twin-grooved to receive a pair of axially spaced O-rings 264 and the flange 258 is twin-grooved to receive a pair of O-rings 266. The bore 120′ includes several ports which, to avoid confusion by the placement of a large number of reference numerals close by one another, in the drawings, will in part be identified by reference to the passageways to which they are connected.

Air under pressure is supplied to an inlet opening 268 connected by a passageway 270 to an air feed-in port in the bore 120′. This port, as indicated above, will be referred to as the "port for the passageway 270." A passageway 272 communicating with the hollow interior of the tubular tie rod 28' extends to a port for the passageway 272 in the bore 120'. A port 274 in the bore 120' is connected to a passageway (not shown) which runs to the ambient atmosphere.

Oil is supplied from a source of oil under high pressure to an opening 276 in the plate 24'; this opening being connected by a passageway 278 to a port in the bore 120'. An opening 280 in the rear plate 24' is connected to a conduit which leads to a low pressure oil reservoir as is conventional in hydraulic systems. The opening 280 is connected by a passageway 282 to a port in the bore 120'. A port 284 in the bore 120' is connected in a passageway (not shown) to the rear end of the annular actuating cylinder. Finally, a passageway 286, running at one end into the ambient atmosphere, is connected to the blind end of the bore 120'.

The innermost and outermost positions of the valve body 122' are defined by abutment of a head 286 on the spindle 124' against two striking members. One of these members is the gland 126'. The other is a shoulder 288 in the bore 120'. The valve body 122' is shown in FIG. 11 in its innermost position. Its outermost position readily can be visualized in this figure.

When said valve body is in its innermost position, air under pressure is connected from the opening 268 to the front end of the annular actuating cylinder to effectuate the return of the thrusting piston to a position in which wax can be inserted into the thrusting cylinder. When the valve body 122' is in its outermost position, oil under pressure is applied to the rear end of the actuating cylinder so as to urge the thrusting piston forwardly. In both cases the opposite ends of the actuating cylinder are connected to low pressure, oil and air respectively.

More particularly, the sundry ports that have been mentioned above are so positioned that the following connections are affected:

When the valve body 122' is in its innermost position shown in FIG. 11, the port for the passageway 270 and the port for the passageway 272 are connected through the annular space between the flanges 252, 254; the port 274 communicates with the annular space between the flanges 254, 256 but is not connected to any other ports at this time; the port 274 is isolated from the port for the passageway 270 and from the port for the passageway 272 by the O-ring 262. Therefore, air is supplied under pressure to the front end of the annular actuating cylinder through the hollow tubular tie rod 28'. The port for the passageway 282 is connected to the port 284 through the annular space between the flanges 256, 258 and the port 284 is isolated from the port for the passageway 278 by one of the O-rings 264, thereby the rear end of the actuating cylinder is connected to the low pressure oil reservoir so that as the actuating cylinder is moved rearwardly under air pressure the oil behind the cylinder flows freely to the low pressure oil reservoir.

When the valve body 122' is moved to its outermost position the O-ring 262 isolates the port for the passageway 270 from the port for the passageway 272; the port for the passageway 272 is, however, connected to the port 274 by the annular space between the flanges 254, 256, thereby the front of the actuating cylinder is connected to the ambient atmosphere; the port for the passageway 278 is connected to the port 284 by the annular space between the flanges 256, 258 so as to supply oil under pressure to the rear of the actuating cylinder. An O-ring 266 isolates the port 284 from the port for the passageway 282 whereby to disconnect the rear of the cylinder from the low pressure oil reservoir.

The passageway 286 is included to permit the valve body 122' to be slid between its two extreme positions without compressing the air in the blind end of the bore.

Although my invention has been shown as usefully employed in a batch extruder, i.e. an extruder having a thrusting stroke during which it delivers an extrudible material through an exit opening and a return idle stroke after the performance of which a fresh supply of the extrudible material is inserted in the extrusion chamber, it is to be understood that the invention is not so limited, and it may be embodied in a fluid actuated linear reciprocating apparatus for forcing flowable material through a delivery passageway from which apparatus the material is ejected continuously, that is to say, on the return, as well as the forward stroke of the thrusting piston. The first mentioned type of apparatus is intended for use where the flowable material is substantially solid or semisolid, at ambient temperatures, e.g. wax or grease, or where an idle return stroke with ability to refill the extrusion chamber is desirable; the second mentioned type of apparatus is intended for use where it is desired to avoid batch refilling and the material to be extruded is flowable either at ambient temperatures or when warmed to a convenient temperature.

The aforesaid second type of apparatus is shown in the grease or oil pump 300 illustrated in FIGS. 12–14. Said pump constitutes a thick front plate 302, a thick rear plate 304 and a plurality of the rods including a solid tie rod 305 and three hollow tie rods 306, 308, 310. The tie rods are suitably secured to the two plates in such manner as to hold the plates in rigid parallel spaced relationship. One suitable arrangement has been described with reference to the extruder 20 and, therefore, such description will not be repeated. An inner tubular thrusting cylinder 312 and an outer tubular actuating cylinder 314 are held in the front and rear plates in the manner described with respect to the extruder 20, the two cylinders being disposed in coextensive telescoped coaxial relationship as clearly seen in FIG. 12. An annular actuating piston 316 rides between the two cylinders and a solid thrusting piston 318 rides in the thrusting cylinder 312. A pair of diametrically opposed parallel piston rods 320 secured to the actuating piston are tied by a cross-bar (not shown but identical to the cross-bar 82 of the extruder 20) to a piston rod 322 secured to the thrusting piston and parallel to the piston rods 320 so that the two pistons are interconnected for joint reciprocation. The three piston rods are slidable in packing glands (not shown) in the rear plate 304. Since the thrusting piston will not be withdrawn from the extrusion (thrusting) cylinder, said piston may be transversely aligned with the actuating piston 316, rather than longitudinally displaced therefrom as in the extruder 20.

The pump 300 has two circuits, one a fluid actuating circuit for alternately supplying fluid under pressure to opposite sides of the actuating piston, and the section a supply circuit for leading flowable material from a source to opposite sides of the thrusting piston in turn and then for leading said material to an exit (delivery) opening from opposite sides of the thrusting piston in alternation. Both circuits include suitable valves and passageways now to be described.

The first named circuit has been shown as a pneumatic circuit, although if higher pressures are to be obtained a hydraulic circuit will be utilized with the low pressure discharge returned to a reservoir instead of to the atmosphere. Said pneumatic actuated circuit is energized from a high pressure air supply circuit 324 connected to a passageway 326 that runs to a high pressure inlet port 328 in an automatic cycling main valve bore 329 formed in the front plate 302.

An automatic cycling valve body 330 is slidable in said bore 329, said body including four spaced flanges 332, 334, 336, 338 defining in conjunction with the shank of the valve body three annular passageways 340 (between the heads 332, 334), 342 (between the heads 334, 336), and 344 (between the heads 336, 338). The heads carry sealing O-rings 346, double O-rings being present on the heads 334, 336. The bore 329 is longer than the valve body 330 so that said body can reciprocate between two extreme positions defined by abutment of the heads 332, 338 against stops 347, 348 at opposite blind ends of the bore. For a reason that will be mentioned later, the stops have grooved faces presented to the valve body. The extreme position of the valve body shown in FIGS. 12 and 13 will be referred to as lowermost; the other position will be referred to as uppermost.

In the lowermost position of the automatic cycling valve body high pressure air is supplied to the rear side of the actuating piston and the front side of said piston is connected to the atmosphere; this arrangement is reversed in the uppermost position of the valve body. For the aforesaid purpose I provide in the bore 329 a rear entrance port 350 and a front entrance port 352. The rear entrance port is connected by a passageway 354 to the front end of the hollow tie rod tube 306. The rear end of the tube 306 is connected by a passageway 356 in the rear plate 304 to the rear end of the annular space in the actuating cylinder 314. The front entrance port 352 is connected by a passageway 358 in the front plate 302 to the front end of said annular space. The automatic cycling bore 329 also includes a front exhaust port 360 and a rear exhaust port 362 each connected by a passageway 364 to the atmosphere.

In the lowermost position of the automatic cycling valve body the annular passageway 342 connects the rear entrance port 350 to the high pressure inlet port 328 and the annular passageway 344 connects the front entrance port 352 to the front exhaust port 360; the rear exhaust port 362 is isolated. In the uppermost position of the automatic cycling valve body the annular passageway 342 connects the front entrance port 352 to the high pressure inlet port 328 and the annular passageway 340 connects the rear entrance port 350 to the rear exhaust port 362; the front exhaust port 360 is isolated.

Means also is provided to automatically reverse the cycling valve body position when the actuating piston 316 nears either the front or the back plate 302, 304.

Said means includes a front reversing valve 366 in the front plate 302 and a rear reversing valve 368 in the rear plate 304. Since these valves are identical only one will be described; and the parts of each valve and the passageways associated with each valve will be distinguished by the reference characters F and R.

The front reversing valve 366 comprises a bore 370F in which there rides a piston 372F having a longitudinally notched periphery. A compression spring 374F seated against the blind end of the bore 370F urges the piston 372F towards the actuating cylinder. Said piston is integral with a spindle 376F which extends from the bore 370F through a coaxial opening 378F into the front end of the annular space defined by the two cylinders 312, 314 where the tip of the spindle is located in the front end of the path of travel of the actuating piston 316. The opening 378F is sealed against air pressure in the actuating space by an O-ring 380F. The inner end of the opening 378F is enlarged to form an annular passageway 382F which is connected by a passageway 384F to the atmosphere. The base of the spindle 376F is encircled by a valve washer 386F adapted to seat over and close the annular passageway 384F when the piston 372F is idle, i.e. when the actuating piston 316 is out of contact with the tip of the spindle 376F thereby at such time isolating the interior of the bore 370F from the atmosphere.

The automatic reversing means also includes sundry passageways and ports. Thus the cycling valve body 330 has an axial passageway 388 the opposite ends of which are closed by plugs 390 having restricted, i.e. leak, openings 392 therethrough. A branch passageway 394 connects the axial passageway 388 with the annular high pressure passageway 342. The lower end of the automatic cycling valve bore 329 is connected by a passageway 396 in the front plate 302 to the front end of the hollow tie rod tube 308 the rear end of which is connected by a passageway 398 in the rear plate 304 to the bore 370R of the rear reversing valve. The upper end of the automatic cycling valve bore is connected by a passageway 400 in the front plate 302 to the bore 370F of the front reversing valve.

To explain the automatic reversing operation let it be assumed that the thrusting and actuating pistons are at midstroke, as illustrated, and that the automatic cycling valve body is in its lowermost position, as also illustrated. High pressure air flows from the high pressure air supply conduit 324 to the rear of the actuating piston, driving it forwardly. Also high pressure air enters the branch passageway 394 and flows in both directions along the axial passageway 388 through the restricted openings 392 in the plugs 390 to enter both blind ends of the automatic cycling valve bore 329. The grooves across the faces of the stops 348 prevent the stops from inhibiting outflow of air through the plugs; however until equilibrium is attained flow of air through the plugs is comparatively slow due to the small diameters of the openings 392. Nevertheless high pressure air is present at both blind ends of the valve bore 329 so that the valve body 330 remains stationary, incidental movement being checked by the friction of the O-rings 346. At this time both blind ends of the bore 329 are blocked from the atmosphere by the seated pistons of the reversing valves 366, 368.

Eventually the actuating piston will come close enough to the front plate 302 to shift the piston 372F off its seat on the annular passageway 382F thereby exposing the upper blind end of the bore 329 to atmospheric pressure through the passageways 400, 384F. These passageways and their associated passageways constituting the passageway 382F and the notches at the periphery of the piston 372F are of gross cross-sectional area compared to the cross-sectional area of the upper restricted opening 392 so that the pressure at the upper blind end of the automatic cycling valve bore will drop. Since the pressure at the lower blind end of said bore is high the automatic cycling valve body 330 will be driven up against the upper stop to connect the front end of the actuating cylinder to high pressure air and the rear end to the atmosphere, whereby to automatically reverse the direction of travel of the actuating piston. A similar reversing action takes place when the actuating piston nears the rear plate 304.

The second circuit, i.e. the supply circuit for leading the flowable material from a source to opposite sides of the thrusting piston in turn and then for leading said material to an exit (delivery) opening from opposite sides of the thrusting piston in alternation, includes a conduit 402 connected to a supply source of the flowable material, e.g. an oil sump (not shown). Said conduit runs into a passageway 404 in the front plate 302. The passageway 404 leads oil to a branch 406 extending from the cylinder 408 of a double (twin) check valve. More particularly the opposite ends of said cylinder are closed off by ball checks 410, 412 biased by springs 414 against the cylinder 408 to seal the openings therefrom. The balls are only lightly loaded by said springs. One ball 410 blocks flow from a passageway 416 back to the cylinder 408; the other ball 412 blocks flow from a passageway 418 back to the cylinder 408. The passageway 416 runs into a passageway 420 that connects to the front end of the hollow tie rod tube 310. The rear end of said tube is connected by a passageway 422 (not shown, but schematically indicated in FIG. 13) in the rear block 304 to the rear end of the thrusting cylinder 312. The passageway 418 runs into a passageway 424 in the front block that leads to the front end of the thrusting cylinder 312. The two passageways 420, 424 are also connected by passageways 426, 428 to check valves 430, 432 leading to a common chamber 434 from which a passageway 436 runs to an exit or high pressure delivery conduit 438. A spring 440 lightly biasses the ball of the check valve 430 to block the passageway 426 and the ball of the check valve 432 to block the passageway 428. Said check valves thereby prevent back flow from the high pressure delivery conduit 438.

In operation let it be assumed that the actuating piston is driving the thrusting piston forwardly. Oil at the front side of the thrusting piston will be forced at high pressure out of the front end of the extrusion cylinder 312 through the passageway 424. This high pressure oil is blocked by the check valve ball 412 from entering the low pressure passageway 404. However the high pressure oil flows through the passageway 428, past the check valve ball 432 into the chamber 434, and out the high pressure delivery conduit 438. The check valve ball 430 prevents the high pressure oil from entering the passageway 420 leading to the rear side of the thrusting piston. Simultaneously subatmospheric pressure is generated at the back side of the thrusting piston. This low pressure will draw in oil from the supply conduit 402 through the passageway 404, past the check valve ball 410 (the check valve ball 412 closes the other opening to the twin check valve body), through the passageways 416, 420 (the check valve ball 430 effectively blocks outflow of oil from the chamber 434), through the hollow tube 310, and through the passageway 433 to the rear side of the thrusting piston.

When the thrusting piston reverses its direction of travel oil at high pressure will be delivered from the rear side of the thrusting piston through the passageway 422, the hollow tube 310, the passageways 420, 426 past the check valve ball 430, into the chamber 434, and through the passageway 436 to the high pressure delivery conduit 438. The check valve balls 410, 432 prevent cross-over to the low pressure side of the supply circuit and to the front side of the thrusting piston. Concurrently oil is drawn into the front side of the thrusting piston from the supply conduit 402 through the passageway 404, past the check valve ball 412 and through the passageways 418, 424.

A control valve (not shown) may be inserted in the conduit 438 to regulate, as by varying or cutting off, the flow of material from the pump 300.

It thus will be seen that I have provided apparatuses which achieve the several objects of this invention and are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described my invention, I claim as new and desire to secure by Letters Patent:

1. An extruder for wax or the like extrudable material that is substantially self-form-maintaining at room temperature and will flow under pressure, said extruder comprising:
    (a) a rigid frame,
    (b) an outer actuating cylinder,
    (c) an inner thrusting cylinder coextensive and substantially in transverse registry with the outer actuating cylinder and coaxially disposed within the outer actuating cylinder, the cylinder wall of the outer actuating cylinder and the cylinder wall of the inner thrusting cylinder defining between them an annular actuating space and the cylinder wall of the inner thrusting cylinder defining a solid thrusting space.
    (d) means rigidly interconnecting said cylinders to prevent relative movement therebetween and fixedly securing said cylinders to said frame,
    (e) an annular actuating piston slidable along a longitudinal axis in said annular actuating space,
    (f) a solid thrusting piston slidable along an axis parallel to said longitudinal axis, said solid thrusting piston being disposed in the solid thrusting space of the inner thrusting cylinder,
    (g) said annular actuating piston having a face substantially greater in pressure bearing area than the thrusting area of one face of the solid thrusting piston,
    (h) means closing both ends of the annular actuating space and at least the one end of the solid thrusting space opposed to said one face of this solid thrusting piston,
    (i) means providing an extrusion opening in the closed end of the solid thrusting space, said inner thrusting cylinder being provided at its outer end with an access opening for feeding extrudable material into the solid thrusting space,
    (j) mutually parallel piston rods connected to and extending from the annular actuating piston,
    (k) a piston rod connected to and extending in the same direction from the solid thrusting piston and parallel to the just mentioned piston rods,
    (l) means interconnecting all said piston rods for common movement so that all the pistons will experience simultaneous non-relative parallel displacements of equal lengths, and
    (m) valve means for introducing a fluid under pressure alternately to opposite ends of said annular actuating space so that the annular actuating piston will experience reciprocating movement and whereby said pressure against one face of the annular actuating piston will result in a pressure advantage on the extrudable material between said one face of the solid thrusting piston and said closed end of the solid thrusting space having an extrusion opening therein.

2. An extruder as set forth in claim 1 wherein
    (a) the end of the solid thrusting cylinder opposite to the closed end is open, said solid thrusting piston being withdrawn from the solid thrusting space through said open end when the annular actuating piston is at an end of the annular actuating space, and wherein
    (b) the piston rod interconnecting means includes means movably securing the solid thrusting piston between a position coaxial with the solid thrusting space preparatory to insertion therein and a position clear of said solid thrusting space so as to allow introduction of fresh extrudable material into the open end of the solid thrusting space.

3. An extruder as set forth in claim 1 wherein the inner thrusting cylinder comprises:
    (a) an outer thrusting tube and
    (b) an inner thrusting tube nested within and adjacent to and in slidable engagement with said first mentioned tube, said inner thrusting tube slidably housing said solid thrusting piston and substantially all said extrudable material, and wherein
    (c) means detachably fixedly secures said inner thrusting tube within said outer thrusting tube for selective withdrawal thereof so that withdrawal of the inner thrusting tube from within the outer thrusting tube will remove substantially all of said extrudable material from the extruder.

4. An extruder as set forth in claim 1 wherein means is provided to selectively vary the transverse dimensions and shape of the material extruded, said means including a disc having a plurality of different apertures therein and being rotatably fixed on said frame for selective rotation about an axis parallel to said longitudinal axis, each of said apertures being successively in registry with the extrusion opening so that the extruded material will flow through any selected one of said apertures.

5. An extruder as set forth in claim 1 wherein the valve means alternately introduces liquid under pressure to one end of the annular actuating space and air under pressure to the other end of the actuating space, the liquid operating the actuating piston to move the thrusting piston toward the closed end of the solid thrusting space so as to expel material from the extrusion opening, the other end of the thrusting space being open, the air under pressure operating the actuating piston to move the thrusting piston toward the open end of the thrusting space, whereby if the pressure developed in the actuating space during extrusion of material should rise high enough to cause the liquid to burst a containing enclosure therefor no operator damage will ensue.

References Cited in the file of this patent

UNITED STATES PATENTS

| | | | |
|---|---|---|---|
| 675,880 | Carlisle | June 11, | 1901 |
| 825,301 | Coddington | July 10, | 1906 |
| 1,317,238 | Summey | Sept. 30, | 1919 |
| 1,822,939 | Stout | Sept. 15, | 1931 |
| 1,849,044 | Summey | Mar. 8, | 1932 |
| 2,036,681 | Campbell | Apr. 7, | 1936 |
| 2,070,096 | Smith | Feb. 9, | 1937 |
| 2,401,235 | Farr et al. | May 28, | 1946 |
| 2,587,930 | Uschmann | Mar. 4, | 1952 |
| 2,709,822 | Marsden | June 7, | 1955 |
| 2,717,107 | Moletz et al. | Sept. 6, | 1955 |
| 2,723,405 | Woodward | Nov. 15, | 1955 |
| 2,902,714 | Johnson | Sept. 8, | 1959 |
| 2,971,456 | Thomas | Feb. 14, | 1961 |
| 3,040,382 | Lecat | June 26, | 1962 |